US011986025B2

(12) United States Patent
Bernhard et al.

(10) Patent No.: US 11,986,025 B2
(45) Date of Patent: May 21, 2024

(54) TOOL FOR CLEANING AN AEROSOL-GENERATING DEVICE

(71) Applicant: Philip Morris Products S.A., Neuchatel (CH)

(72) Inventors: Philipp Bernhard, Biel/Bienne (CH); Keethan Dasnavis Fernando, Neuchatel (CH); Alexander Gilcher, Bechhofen (DE); Kilian Augusto Iannucci, Biel/Bienne (CH); Boris Mahler, Neuchatel (CH); Aymeric David Niederhauser, Biel/Bienne (CH); Dani Ruscio, Neuchatel (CH); Fabian Kurt Schneider, Bechhofen (DE); Erwin Schuster, Bechhofen (DE); Loic Sottas, Biel/Bienne (CH)

(73) Assignee: Philip Morris Products S.A., Neuchatel (CH)

( * ) Notice: Subject to any disclaimer, the term of this patent is extended or adjusted under 35 U.S.C. 154(b) by 209 days.

(21) Appl. No.: 16/969,418

(22) PCT Filed: Feb. 28, 2019

(86) PCT No.: PCT/EP2019/055076
§ 371 (c)(1),
(2) Date: Aug. 12, 2020

(87) PCT Pub. No.: WO2019/166595
PCT Pub. Date: Sep. 6, 2019

(65) Prior Publication Data

US 2021/0000187 A1 Jan. 7, 2021

(30) Foreign Application Priority Data

Feb. 28, 2018 (EP) .................................... 18159295

(51) Int. Cl.
*A24F 9/06* (2006.01)
*A24F 40/85* (2020.01)
*B08B 1/16* (2024.01)

(52) U.S. Cl.
CPC ................ *A24F 9/06* (2013.01); *A24F 40/85* (2020.01); *B08B 1/165* (2024.01)

(58) Field of Classification Search
CPC . A24F 9/06; A24F 40/85; A24F 40/20; B08B 1/005; B08B 9/02; B08B 9/021; B08B 9/023
See application file for complete search history.

(56) References Cited

U.S. PATENT DOCUMENTS 6,153,016 A * 11/2000 Rauch ..................... B08B 9/021 15/104.04
6,698,048 B1 * 3/2004 Greene ................... B08B 9/023 29/90.01

(Continued)

FOREIGN PATENT DOCUMENTS

CN 107205494 A 9/2017
EP 0503767 A1 * 9/1992 ............. A24F 15/01

(Continued)

OTHER PUBLICATIONS

Machine translation of EP-0503767-A1 (Year: 1992).*

(Continued)

*Primary Examiner* — Lee D Wilson
*Assistant Examiner* — Robert F Neibaur
(74) *Attorney, Agent, or Firm* — Oblon, McClelland, Maier & Neustadt, L.L.P.

(57) ABSTRACT

A cleaning tool for an aerosol-generating device is provided, the cleaning tool including an elongate body having a proximal end portion and a distal end portion, the distal end portion defining a recess configured to receive a heating (Continued)

element of an aerosol-generating device, the recess extending from an opening in a distal end face of the elongate body towards the proximal end portion of the elongate body, the distal end portion of the elongate body being provided with at least one protrusion inwardly projecting into the recess, and the elongate body further including a scraping surface at the distal end face of the elongate body.

13 Claims, 4 Drawing Sheets

(56) References Cited

U.S. PATENT DOCUMENTS

| | | | | |
|---|---|---|---|---|
| 6,769,151 | B1 * | 8/2004 | Lin | A46B 13/001<br>15/104.095 |
| 2014/0305448 | A1 | 10/2014 | Zuber et al. | |
| 2014/0373856 | A1 | 12/2014 | Zuber et al. | |
| 2018/0049472 | A1 * | 2/2018 | Mahler | A24F 40/40 |
| 2021/0112878 | A1 * | 4/2021 | Ruscio | A24F 40/46 |

FOREIGN PATENT DOCUMENTS

| | | | | |
|---|---|---|---|---|
| EP | 0503767 | A1 * | 11/1992 | A24F 47/00 |
| EP | 2 201 850 | A1 | 6/2010 | |
| JP | 2012-513750 | A | 6/2012 | |
| JP | 3215368 | U | 3/2018 | |
| JP | 2018-191550 | A | 12/2018 | |
| JP | 2019-50770 | A | 4/2019 | |
| RU | 2 426 481 | C2 | 8/2011 | |
| WO | WO 2013/083963 | A1 | 6/2013 | |
| WO | WO-2013083963 | A1 * | 6/2013 | A24F 13/02 |
| WO | WO 2013/098405 | A2 | 7/2013 | |
| WO | WO 2013/098409 | A1 | 7/2013 | |
| WO | WO 2013/102614 | A2 | 7/2013 | |
| WO | WO 2016/124550 | A1 | 8/2016 | |

OTHER PUBLICATIONS

Notice of Allowance dated Jun. 3, 2022 in Russian Patent Application No. 2020131517, (with English translation), 13 pages.
International Search Report issued on Jun. 3, 2019 in PCT/ PCT/EP2019/055076 filed on Feb. 28, 2019 (4 pages).
Written Opinion of the International Searching Authority dated Jun. 3, 2019 in PCT/EP2019/055076 filed on Feb. 28, 2019 (5 pages).
Notice of Reasons for Rejection dated Jan. 10, 2023 in Japanese Patent Application 2020-542573 filed on Feb. 28, 2019 (with English Translation, total 10 pages).
Combined Chinese Office Action and Search Report dated Aug. 9, 2023 in Chinese Application 201980011944.X, (with English translation), 14 pages.

* cited by examiner

TOOL FOR CLEANING AN AEROSOL-GENERATING DEVICE

The present invention relates to a cleaning tool for an aerosol-generating device. In particular, the invention relates to a cleaning tool for cleaning at least a heating element of an aerosol-generating device.

Aerosol-generating articles in which an aerosol-forming substrate for generating an inhalable aerosol is heated, rather than combusted, are known in the art. The aim of such heated aerosol-generating articles is to reduce known harmful smoke constituents produced by the combustion and pyrolytic degradation of tobacco in conventional cigarettes. Typically in such heated aerosol-generating articles, an aerosol is generated by the transfer of heat from a heat source to a physically separate aerosol-forming substrate or material, which may be located within, around or downstream of the heat source. During smoking, volatile compounds are released from the aerosol-forming substrate by heat transfer from the heat source and entrained in air drawn through the smoking article. As the released compounds cool, they condense to form an aerosol that is inhaled by the consumer. Such aerosol-generating articles are typically provided in a container of aerosol-generating articles, much like a cigarette container or pack.

WO2013102614 discloses an example of an electrically operated aerosol-generating device in which an aerosol-forming substrate of an aerosol-generating article is heated in direct contact with a heating element to form an inhalable aerosol. The heating element is in the form of a blade which is inserted into an aerosol-forming substrate segment of an aerosol-generating article. It is also known to insert heating pins into such aerosol-forming substrate segments, instead of or in addition to a heating blade.

In such a device configuration, heat from the heating element may be conveyed almost instantaneously to at least a portion of the aerosol-forming substrate when the heating element is actuated, and this may facilitate the rapid generation of an aerosol. Furthermore, the overall heating energy required to generate an aerosol may be lower than would be the case in a system where the aerosol-forming substrate does not directly contact a heating element and initial heating of the substrate occurs by convection or radiation. Where a heating element is in direct contact with an aerosol-forming substrate, the initial heating of portions of the substrate that are in contact with the heating element will be effected by conduction.

When an aerosol-forming substrate, such as a tobacco substrate, is heated, volatile compounds are released. Volatile compounds and aerosol evolved by the heat from the heating element may become deposited on the aerosol-generating device and in particular on a surface of the heating element. Particles of the aerosol-forming substrate itself may also become adhered to the heating element, particularly if the heating element is in direct contact with the aerosol-forming substrate. For example, when using the device described in WO2013102614, a heating blade warms a tobacco substrate to temperatures in excess of 200° C., releasing volatile compounds, nicotine and glycerol, all of which form a respiratory aerosol for inhalation by the consumer. However, residues and dust tend to collect inside the cavity in the device after smoking multiple aerosol-generating articles.

Particles and compounds adhered to and deposited on the heating element or in the cavity of an aerosol-generating device may prevent the heating element from functioning in an optimal manner. These particles and compounds may also break down during use of the aerosol-generating device and impart unpleasant or bitter flavours to a user. For these reasons it is desirable to clean the heating element and the cavity in which the heating element is located periodically.

Cleaning may be effected by a pyrolysis method, in which the heating element is heated to a temperature sufficiently high to burn any residues or deposits. Pyrolysis on its own may not always be effective, however. A cleaning consumable, such as a brush, may be used as an alternative to, or in addition to, pyrolysis. However, such prior art cleaning consumables may not be completely effective at cleaning all of the heater blade, the cavity in the device, or both. Furthermore, such prior art cleaning consumables may not be easily carried around by the user in addition to the aerosol-generating device and the container of aerosol-generating articles. As a result, the cleaning consumable may be forgotten or viewed as an inconvenience, particularly if the cleaning consumable is cumbersome. This may lead to infrequent cleaning of the heating element or the cavity and reduced performance.

According to a first aspect of the present invention there is provided a cleaning tool for cleaning an aerosol-generating device. The cleaning tool comprises an elongate body having a proximal end portion and a distal end portion, wherein the distal end portion of the elongate body defines a recess for receiving a heating element of an aerosol-generating device. The recess extends from an opening in a distal end face of the elongate body towards the proximal end portion of the elongate body. The distal end portion of the elongate body is provided with at least one protrusion inwardly extending or projecting into the recess.

Advantageously, the first aspect of the present invention comprises a cleaning tool having an elongate body. The body may be insertable into a heating chamber or cavity of an aerosol-generating device, which contains one or more heating elements, such as a heating blade or a heating pin. The distal end portion of the elongate body has a recess for receiving such a heating element of the aerosol-generating device. Within the distal end portion of the elongate body is at least one protrusion which extends or projects into the recess.

Advantageously, by providing the tool with at least one protrusion which extends into the recess, the tool may be used to clean the heating element by moving the tool relative to the heating element such that the at least one protrusion engages with the heating element, when the heating element is disposed within the recess of the tool. The recess and the at least one protrusion can therefore form a cleaning portion of the tool, which can be used to clean a heating element.

Advantageously, by providing a cleaning portion of the tool within an internal region of the tool, dirt or debris removed by the tool during cleaning is less likely to come into contact with other objects, such as a consumer's fingers, after the tool has been removed from the cavity of the aerosol-generating device. The tool may therefore be handled more easily. Furthermore, the tool may be more conveniently stored. That is, the tool may be more conveniently stored than prior art cleaning tools. For example, the elongate body may enable the tool to be conveniently stored in a container of aerosol-generating articles. Accordingly, the tool may be sized and shaped to conform to the size and shape of an aerosol-generating article. In particular, the tool may be provided with a cross-sectional shape equivalent to that of an aerosol-generating article. This may allow for the tool to be included within a bundle of aerosol-generating articles, when a container of aerosol-generating articles is being manufactured. This may allow for one or more tools according to the invention to be supplied to a consumer within a container of aerosol-generating articles.

Therefore, the present invention may also provide for a container comprising a bundle of aerosol-generating articles and one or more tools according to the first aspect of the present invention.

Preferably, the at least one protrusion is elastically deformable. This can improve the cleaning effect of the at least one protrusion. For example, this may help to increase the contact time between the at least one protrusion and the heating element during cleaning. This may also help to reduce the risk of the at least one protrusion damaging the heating element during cleaning.

The at least one protrusion is therefore preferably formed of a flexible material. The flexible material should preferably be such that when the tool is moved within the cavity in the device, the at least one protrusion can bend while abutting the heating element, without damaging it. This bending action whilst in contact with the heating element can result in a wiping action of the heating element, and thereby remove debris from the heating element.

Preferably, the at least one protrusion comprises or is formed of one or more thermoplastic elastomers (TPE), such as one or more of Arnitel, Hytrel, Dryflex, Mediprene, Kraton, Pibiflex, Sofprene, and Laprene.

The at least one protrusion disposed within the recess may be formed of the same material as the elongate body of the tool. Preferably, the at least one protrusion disposed within the recess is formed of a different material than that which forms the elongate body of the tool. For example, the elongate body of the tool may be formed of a mouldable plastic and the at least one protrusion disposed within the recess may be formed of a flexible material, such as one or more thermoplastic elastomers.

The at least one protrusion disposed within the recess may be secured to the elongate body by way of an adhesive. The at least one protrusion may be mechanically secured to the elongate body.

The elongate body may have any suitable shape which can enable it to be inserted into a cavity of an aerosol-generating device. Preferably, the elongate body is substantially cylindrical. That is, preferably the elongate body has a substantially circular cross-sectional shape. This can be advantageous for a number of reasons. For example, since most aerosol-generating articles are generally cylindrical, a cavity for an aerosol-generating device is often also generally cylindrical. By providing the tool with a cylindrical elongate body, the tool can be easily located within the cavity of such aerosol-generating devices. Furthermore, the cylindrical shape of the elongate body can help to ensure that the tool, and in particular the tool's at least one protrusion, is appropriately aligned with a heating element within the cavity of the device. This can help to improve the cleaning effect of the tool. In addition, the cylindrical shape of the elongate body can allow for the tool to be stored and transported in a container for aerosol-generating articles. This is because the tool can occupy the space that might otherwise have been occupied by an aerosol-generating article within the container.

Preferably, the elongate body of the cleaning tool has a total length of between approximately 40 millimetres and approximately 60 millimetres. Preferably, the elongate body of the cleaning tool has a total length of approximately 50 millimetres.

Preferably, the elongate body of the cleaning tool has an external diameter of between approximately 6 millimetres and approximately 8 millimetres. Preferably, the elongate body of the cleaning tool has an external diameter of approximately 7 millimetres.

Preferably, the at least one protrusion is substantially planar. Preferably, the major dimension of the substantially planar protrusion extends along at least a portion of the length of the elongate body. The major dimension of the substantially planar protrusion extends along a line which is parallel to the longitudinal axis of the elongate body. A substantially planar protrusion may advantageously provide an improved cleaning effect over other cleaning objects such as brushes, because it can have an increased contact area with the heating element.

Preferably at least a portion of the at least one protrusion is disposed at the distal end face of the elongate body. Put another way, preferably at least some of the protrusions within the recess are disposed at least at the distal end face of the elongate body. This can help to ensure that the protrusions are able clean the base of a heating element.

Preferably, the at least one protrusion disposed within the recess extends along at least 20 percent of the length of the elongate body. More preferably, the at least one protrusion disposed within the recess extends along at least 30 percent of the length of the elongate body. Preferably, the at least one protrusion disposed within the recess extends along less than 70 percent of the length of the elongate body. By arranging for the protrusion to extend along such a length, the protrusion can be used to clean the majority or all of the length of the heating element.

Preferably, the at least one protrusion extends from a peripheral region of the elongate body towards a radial centre of the elongate body.

A single protrusion may be provided in the recess. Alternatively, the at least one protrusion may consist of a plurality of protrusions, each of which inwardly extends or projects into the recess. This may help to increase the cleaning efficiency of the tool.

Preferably, the plurality of protrusions are uniformly disposed around the recess. This may help to provide a more even cleaning of a heating element disposed within the recess.

Preferably, the tool comprises no more than six protrusions within the recess, more preferably no more than four protrusions within the recess. In some preferred embodiments, the plurality of protrusions consist of between 2 and 4 protrusions. In some particularly preferred embodiments, the plurality of protrusions consist of 3 protrusions. Such a number of protrusions is thought to provide an optimal balance between increasing the cleaning efficiency of the tool, whilst reducing the risk of a heater element becoming damaged by the tool. Restricting the total number of protrusions within the tool may also help to ensure that there is sufficient space available within the recess for a heating element or heating elements.

The recess may extend through the entire length of the elongate body of the tool. Alternatively, the recess may extend from the distal end face of the elongate body to a base within the elongate body. The base is preferably disposed between the distal end portion of the elongate body and the proximal end portion of the elongate body. The base may define the most proximal point of the recess. The base may be used to prevent the tool from being inserted too far into the cavity of an aerosol-generating device.

Where the recess extends between the distal end face of the elongate body and a base within the elongate body, and thus only extends along a part of the length of the elongate body of the tool, preferably the length of the recess is equal to at least 10 percent of the length of the elongate body. More preferably, the length of the recess is equal to at least 25 percent of the length of the elongate body. Even more preferably, the length of the recess is equal to at least 40 percent of the length of the elongate body.

With the exception of the opening at the distal end face of the elongate body, the recess may be fully enclosed by the elongate body. This means that any debris which becomes deposited in the recess during cleaning may not easily escape said recess after cleaning. This can advantageously reduce the likelihood of such debris coming into contact with the consumer or another article, after the tool has been moved away from the aerosol-generating device.

The elongate body may include one or more openings along a side wall of the elongate body, and the recess may extend from the distal end face of the elongate body to said one or more side openings. Such side openings may help a consumer to remove debris from the recess between cleaning, if desired. For example, a consumer could blow through the recess or one of the side openings to dispel any debris from the recess after they have used the tool. Use of such one or more side openings may also allow for the tool to be manufactured using less material.

The elongate body may be formed of a single part. The elongate body may comprise a first part and a second part, which is secured to the first part. The first part may comprise a plurality of support arms which form at least part of the distal end portion of the elongate body. Preferably, the plurality of support arms consists of from two to four support arms, more preferably three support arms. The second part may comprise a tubular portion which forms at least part of the distal end portion of the elongate body. The tubular portion of the second part may extend around and be secured to the distal ends of the support arms. The distal of each support arms may be provided with a trench in which the tubular portion of the second part sits. Preferably the tubular portion formed of an elastically deformable material, and is secured to the support arms by elastic tension.

The support arms and the second part may together define the recess at the distal end portion of the elongate body. In particular, the support arms and the tubular portion of the second part may together define the recess at the distal end portion of the elongate body.

Where the recess comprises a base, the base is preferably provided at the base of the plurality of support arms.

The first set of protrusions preferably extend from the tubular portion of the second part of the elongate body into the recess.

Preferably, the elongate body further comprises a scraping surface at the distal end face of the elongate body. The scraping surface can allow for mechanical cleaning of surfaces within the cavity of the aerosol-generating device, and in particular, surfaces disposed at the base of the cavity. Put another way, preferably the scraping surface is configured to clean the inner surface of the cavity of the aerosol-generating device, and in particular, one or more surfaces disposed at the base of the cavity.

The tool of the first aspect of the present invention may therefore comprise two cleaning means for cleaning an aerosol-generating article. The first means is the at least one protrusion disposed within the recess of the tool for cleaning a heating element of the aerosol-generating article. The second means is the scraping surface disposed at the distal end face of the elongate body of the tool for cleaning a base surface of the cavity, which contains the heating element of the aerosol-generating article. Such dual cleaning means can advantageously allow for a single tool to be provided, which can clean both a heating element and the base of a cavity of an aerosol-generating article in a single action.

Accordingly, according to a second aspect of the invention, there is provided a cleaning tool for an aerosol-generating device, the tool comprising: an elongate body having a proximal end portion and a distal end portion, wherein the distal end portion of the elongate body defines a recess for receiving a heating element of an aerosol-generating device, the recess extending from an opening in a distal end face of the elongate body towards the proximal end portion of the elongate body, and wherein a first cleaning means is provided within the recess and a second cleaning means is provided on the distal end face of the elongate body. The first cleaning means is distinct from the second cleaning means. The first cleaning means is for cleaning a heating element of an aerosol-generating article. The second cleaning means is for cleaning a base surface of a cavity which contains a heating element of an aerosol-generating article.

The scraping surface of the elongate cleaning tool may be a flat or curved surface at the distal end of the elongate cleaning tool. The scraping surface of the elongate cleaning tool may be a sharp tip formed by the convergence of two edges of the elongate cleaning tool. For example, the scraping surface may be defined by a second set of protrusions at the distal end face of the elongate body. Each protrusion in the second set of protrusions may have a curved edge defining the scraping surface. Such a curved surface may be shaped to conform to a curved surface present at the base of a cavity of the aerosol-generating device.

Each protrusion in the second set of protrusions may be in the form of a tooth comprising at least two ridges extending around a recessed portion. Preferably, each tooth comprises three connected ridges, which partially surround a recessed portion. Preferably, the middle ridge has a convex leading edge, and the ridges either side of the middle ridge each have a concave leading edge.

Preferably, the second set of protrusions are uniformly disposed around the recess.

Preferably, the tool comprises no more than six protrusions forming the scraping surface, more preferably no more than four protrusions forming the scraping surface. In some preferred embodiments, the plurality of protrusions forming the scraping surface consist of between 2 and 4 protrusions. In some particularly preferred embodiments, the plurality of protrusions forming the scraping surface consist of 3 protrusions.

Preferably, the scraping surface is disposed around a peripheral region of the distal end face of the elongate body.

Preferably, the scraping surface is formed of a rigid material. Preferably, the scraping surface is formed of the same material as the material forming the elongate body. Preferably, the scraping surface is formed of a plastic, such as a polyimide.

Where the tool comprises a plurality of support arms forming at least part of the distal end portion of the elongate body, preferably the scraping surface is provided on the ends of each support arm. More preferably, the end of each support arm comprises at least one tooth comprising at least two ridges extending around a recessed portion.

A tool in accordance with the first or second aspects of the invention may be advantageously sized and shaped such that it is suitable for transport in a container of aerosol-generating articles. This may improve the way in which a consumer can store or transport the tool. This may improve the way in which the tool can be supplied to a consumer.

Accordingly, according to a third aspect of the present invention there is provided a container containing a plurality of aerosol-generating articles and one or more tools according to one or both of the first and second aspect of the present invention. The container preferably comprises a box portion and a lid portion hingedly attached to the box portion. The plurality of aerosol-generating articles and the one or more tools are preferably provided in the box portion. The lid portion may be movable between an open position in which the plurality of aerosol-generating articles and the one or more tools are accessible, and a closed position in which the lid portion covers the box portion.

As used herein, the term "longitudinal" refers to a direction parallel to the length of the elongate body of the tool.

The terms "longitudinal", "transverse", "proximal" and "distal" are defined in terms of the elongate body of the cleaning tool. As such, the term "longitudinal" refers to the direction along the length of the body of the cleaning tool, and the term "transverse" refers to the direction perpendicular to the longitudinal direction. The term "distal end" refers to the end of the elongate body of the cleaning tool, which is intended to be received first by an aerosol-generating article. The term "proximal end" refers to the end of the body of the cleaning tool which is opposite to the distal end. This is typically the end by which the cleaning tool is grasped during use.

The term "length" refers to the maximum dimension of the elongate cleaning tool in the longitudinal direction. The term "diameter" refers to the maximum dimension of the elongate cleaning tool in the transverse direction.

The term "elongate body" refers to a body of the cleaning tool having a length which is greater than its diameter. For example, the cleaning tool may have a length which is at least twice the diameter of the cleaning tool.

The term "inner surface" is used throughout the specification to refer to the surface of a component of the cleaning tool that is facing towards the interior of the cleaning tool. Likewise, the term "outer surface" is used throughout the specification to refer to the surface of a component of the cleaning tool that is facing towards the exterior of the cleaning tool.

Preferably, the tip of at least one projection is located from the radial centre of the elongate body of the cleaning tool by a distance of less than 40 percent, more preferably less than 30 percent, even more preferably less than 23 percent of the radius of the elongate body of the cleaning tool.

As used herein, 'radial centre' refers to the central point in a cross section of the elongate body of the cleaning tool, as taken orthogonally to the longitudinal direction of the elongate body of the cleaning tool. The cross section is taken at a point along which the at least one projection in the recess resides.

As used herein, an 'aerosol-generating device' relates to a device that may interact with an aerosol-forming substrate to generate an aerosol.

As used herein, the term 'aerosol-forming substrate' relates to a substrate capable of releasing volatile compounds that may form an aerosol. Such volatile compounds may be released by heating the aerosol-forming substrate.

The aerosol-forming substrate may be part of an aerosol-forming article.

As used herein, the term 'aerosol generating system' refers to a combination of an aerosol-generating device and one or more aerosol-forming articles for use with the device. An aerosol-generating system may include additional components, such as a charging unit for recharging an on-board electric power supply in an electrically operated or electric aerosol-generating device.

The aerosol-forming substrate may be part of an aerosol-generating article. The aerosol-forming substrate may have any suitable configuration. Preferably, the aerosol-forming substrate or aerosol-forming article has the shape of a substantially annular cylinder. Such a shape may be particularly suited to aerosol-generating articles and heating elements in accordance with the present invention.

The aerosol-forming substrate may be a solid aerosol-forming substrate. Alternatively, the aerosol-forming substrate may comprise both solid and liquid components. The aerosol-forming substrate may comprise a tobacco-containing material containing comprising volatile tobacco flavour compounds which are released from the substrate upon heating. Alternatively, the aerosol-forming substrate may comprise a non-tobacco material. The aerosol-forming substrate may further comprise an aerosol former that facilitates the formation of a dense and stable aerosol. Examples of suitable aerosol formers are glycerine and propylene glycol.

The invention will now be further described, by way of example only, with reference to the accompanying drawings in which.

Figure 1:
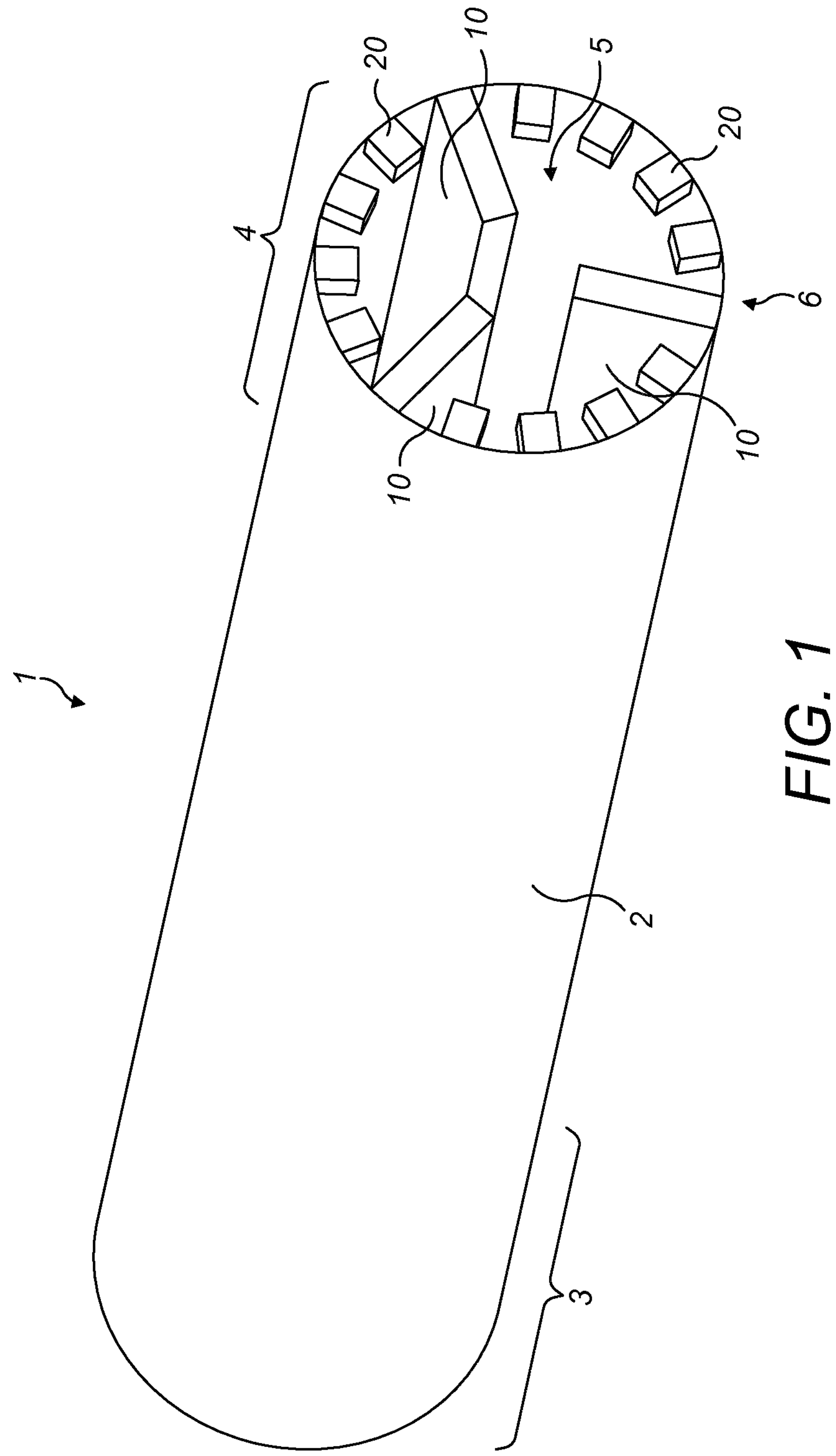
FIG. 1 shows a perspective view of a tool according to a first embodiment of the present invention.

FIG. 1 shows a perspective view of a tool 1 according to a first embodiment of the present invention. The tool 1 comprises an elongate body 2 having a generally cylindrical shape, with a proximal end portion 3 and a distal end portion 4. The distal end portion 4 of the elongate body defines a recess 5 for receiving a heating element of an aerosol-generating device. The recess 5 extends from an opening in a distal end face 6 of the elongate body 2 towards the proximal end portion 3 of the elongate body 2.

At the distal end face 6 are a first set of protrusions 10. Each of these protrusions 10 extends into a central region of the recess 5 from a point on the periphery of the distal end face 6, as viewed along the longitudinal axis of the elongate body 2. In the embodiment of FIG. 1, three such protrusions 10 are provided, with said protrusions 10 being uniformly spaced around the recess. This provides a symmetrical profile for the first set of protrusions 10. The ends of each of these protrusions are spaced adjacent to the radial centre of the cross-section of the elongate body 2. This defines a central portion within the recess 5 into which a heating element may be inserted without obstruction.

Each of these protrusions 10 is in the form of a substantially planar fin 10, with the major dimension of the substantially planar fin 10 extending along at least a portion of the length of the elongate body 2. In other words, the protrusion 10 extends from the distal end face 6 along the length of the elongate body 2. This can help the protrusions 10 to clean more of a heating element when in use.

In particular, when the device of FIG. 1 is in use, a heating element can be inserted into the recess 5 such that at least a portion of the length of the heating element extends along at least a portion of the length of the recess. The tool 1 can then be moved relative to the heating element, for example by rotating the tool 1 relative to the heating element. Such rotational movement can cause the fins 10 to come into contact with the heating element. As the tool 1 is further rotated, the fins 10 may engage and slide along the surface of the heating element to impart a cleaning action. This can result in debris being removed from the surface of the heating element.

The distal end face 6 of the tool of FIG. 1 is also provided with a second set of protrusions 20. These are disposed around the peripheral region of the distal end face 6, with each of said protrusions 20 extending towards the central region of the distal end face 6. In the embodiment of FIG. 1, twelve such protrusions 20 are provided, with said protrusions 20 being uniformly spaced around the recess. This provides a symmetrical profile for the second set of protrusions 20.

The protrusions 20 of the second set are smaller than the protrusions of the first set 10. That is, second protrusions 20 do not extend as far across the distal end face 6, as the first protrusions 10. Instead, the second protrusions 20 remain in the peripheral region of the distal end face 6. Furthermore, the length of the second protrusions 20 longitudinal axis of the elongate body 2 is smaller than that of the first protrusions 10. Consequently, the second protrusions 20 do not extend far into the recess 5.

The second protrusions 20 are preferably formed of a rigid material, such as a polyimide. The first protrusions 10 are preferably formed of a flexible material, such as a thermoplastic elastomer. In the embodiment of FIG. 1, the second protrusions 20 are formed integrally with the elongate body 2.

The second protrusions 20 can together form a scraping surface at the distal end face 6 of the elongate body 2, which can be used to provide a different cleaning function from that of the first protrusions 10. In particular, the second protrusions 20 can be used to clean the base of a cavity which contains a heating element of an aerosol-generating article. The cleaning function of the second protrusions 20 can be initiated by movement of the tool 1 relative to the cavity and heating element. Such movement may be a rotational movement.

Figure 2:
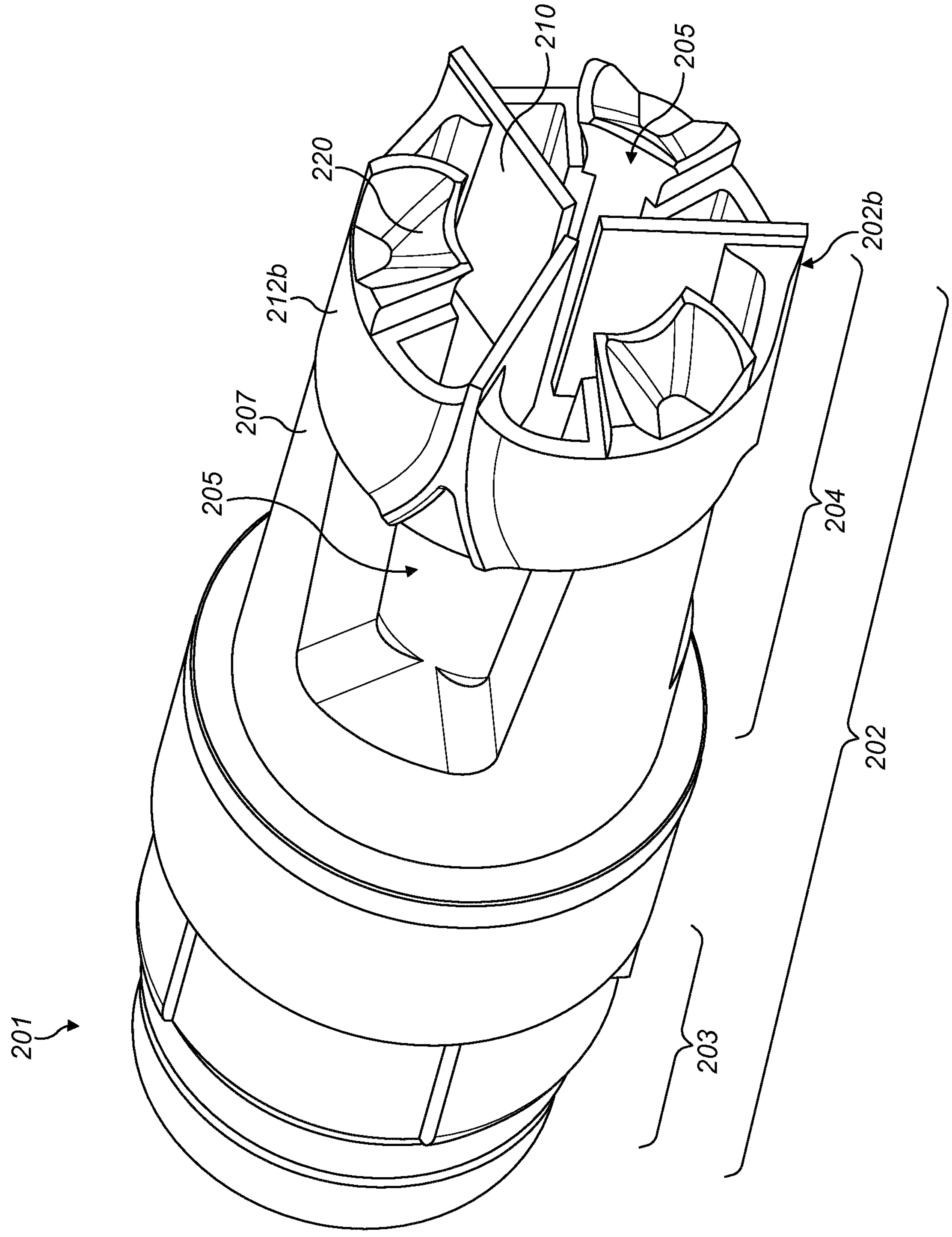
FIG. 2 shows a perspective view of a tool according to a second embodiment of the present invention.
Figure 3:
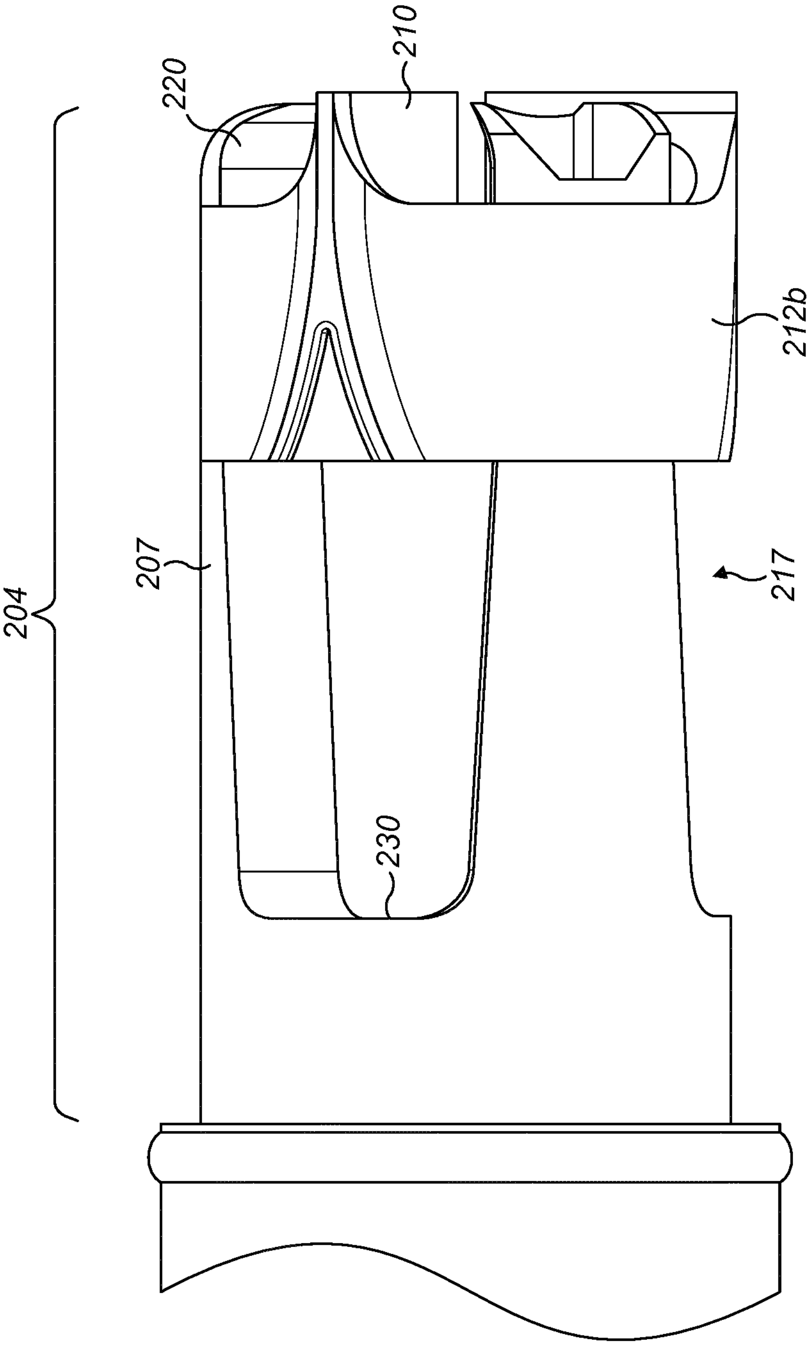
FIG. 3 shows a side view of a portion of the tool of FIG. 2.
Figure 4:
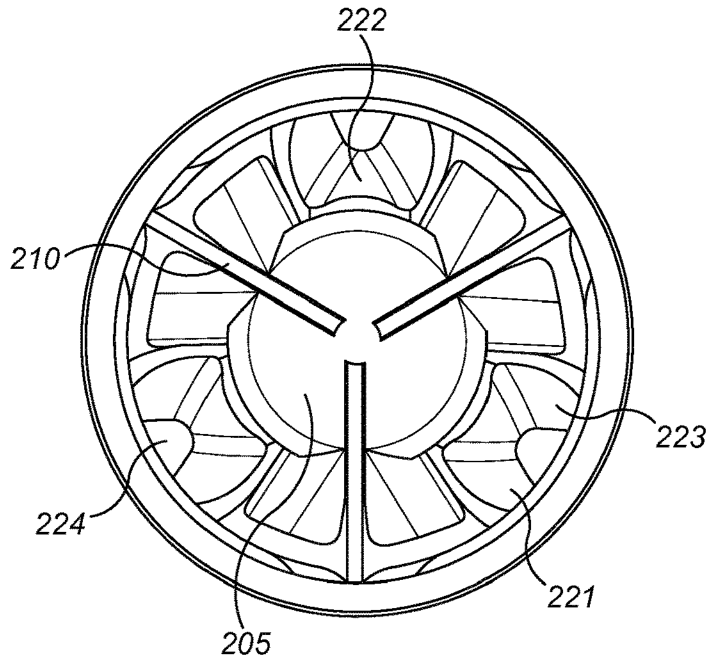
FIG. 4 shows a view of the distal end face of the elongate body of the tool of FIGS. 2 and 3, as viewed along the longitudinal axis of the tool.

FIGS. 2 to 4 show various view of a tool 201 according to a second embodiment of the present invention. The tool 201 comprises an elongate body 202, which is substantially cylindrical in shape and has a proximal end portion 203 and a distal end portion 204. The elongate body 202 is formed of two parts; a first part 202*a* formed of plastic, and a second part 202*b* formed of a thermoplastic elastomer. The distal end portion 204 of the elongate body 202 is formed by three support arms 207 of the first part 202*a*, and by the second part 202*b*. In particular, the second part 202*b* comprises a tubular portion 212*b*, which extends around and is secured to the distal ends of the support arms 207. The distal ends of each support arms 207 is provided with a trench in which the tubular portion 212*b* of the second part 202*b* sits.

The tubular portion 212*b* may be secured to the distal ends of the support arms 207 by any suitable means, such as an adhesive. In the embodiment of FIG. 2 the tubular portion 212*b* is secured to the distal ends of the support arms 207 by elastic tension. That is, during assembly of the elongate body 202, the tubular portion 212*b* is stretched over the distal ends of the support arms 207. The inherent elasticity in the second part 202*b* can then result in the tubular portion 212*b* gripping the support arms 207, so that the second part 202*b* is held in place relative to the first part 202*a*.

The support arms 207 and the second part 202*b* together define a recess at the distal end portion of the elongate body 202. The recess 205 extends from an opening in the distal end face 206 of the elongate body 202 to a base 230 in the elongate body 202. The support arms 207 and base 230 of the first part 202*a*, as well as the tubular portion 212*b* of the second part 202*b* together define three side openings 217 along the side wall of the elongate body. Such side openings 217 expose portions of the recess 205.

The tool 201 of the embodiment of FIGS. 2 to 4 also comprises a plurality of fins 210 which extend from the tubular portion 212*b* of the second part 202*b* into the recess 205. The fins 210 are integrally formed with the tubular portion 212*b*, and thus also formed from thermoplastic elastomer. This enables the fins 210 to be deflected by an object, such as a heating element, when the object is inserted into the recess 205. As with the embodiment of FIG. 1, the fins 210 of the tool in FIGS. 2 to 4 are uniformly spaced around the recess 205, providing a symmetrical profile for the fins 205.

A protrusion in the form of a tooth 220 is provided on the end of each support arm 207 to define a scraping surface for the tool 201 of FIGS. 2 to 4. Each tooth comprises three connected ridges 221, 222, 223, which partially surround a recessed portion 224. The middle ridge 222 of each tooth has a convex leading edge 226, and the ridges 221, 223 either side of the middle ridge 222 each have a concave leading edge 227, 228.

Figure 5:
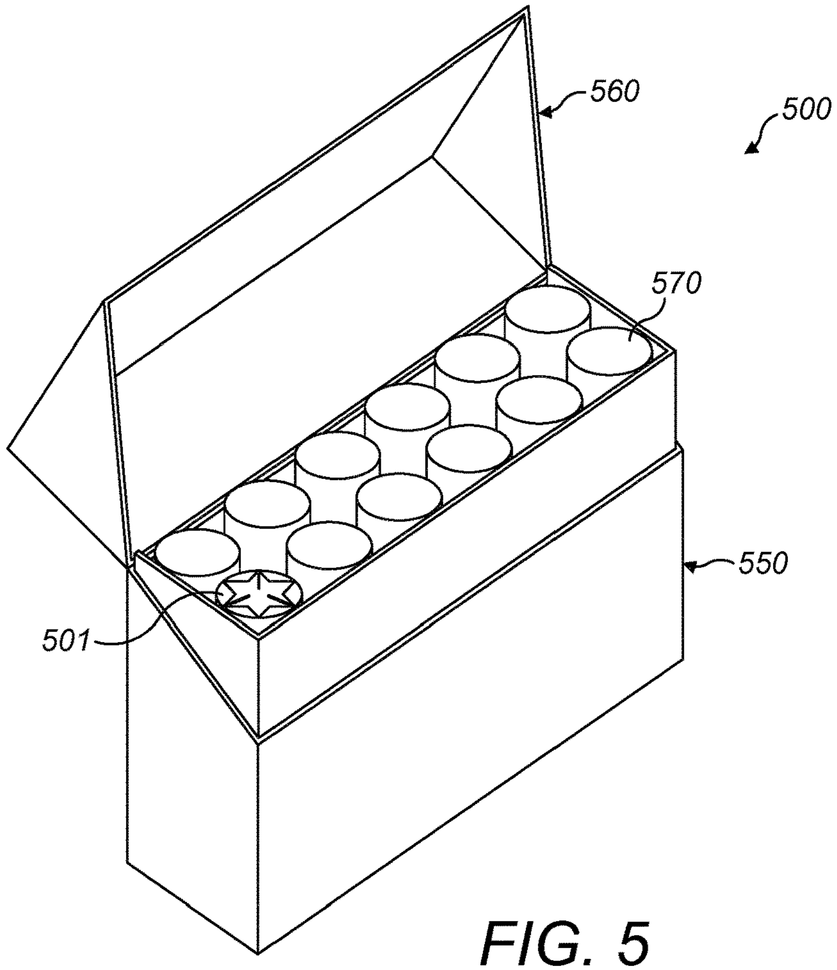
FIG. 5 shows a container comprising a bundle of aerosol-generating articles and a tool according to a third embodiment of the present invention.

FIG. 5 shows a container 500 containing a bundle of aerosol-generating articles 570 and a cleaning tool 501. The container 500 comprises a box portion 550 and a lid portion 560 hingedly connected to the box portion 550. Within the box portion 550 are a plurality, in this case eleven, aerosol-generating articles 570. The aerosol-generating articles 570 are substantially cylindrical and arranged with their longitudinal axes extending from the base of the box portion 550 to the top of the box portion 550. The lid is shown in an open position in FIG. 5, but can be hingedly moved to a closed position, whereby the lid covers the top of the box portion 550. Disposed in the box portion 550 amongst the aerosol-generating articles 570 is a cleaning tool 501. The cleaning tool has an elongate body, which is substantially cylindrical and which is sized and shaped to be similar to the size and shape of each aerosol-generating article 570 within the container 500. Consequently, the cleaning tool 501 can occupy the same amount of space as any one of the aerosol-generating articles 570.

The invention claimed is:

1. A cleaning tool for an aerosol-generating device, the cleaning tool comprising:

an elongate body having a proximal end portion and a distal end portion, wherein the distal end portion of the elongate body defines a recess configured to receive a heating element of an aerosol-generating device, the recess extending from an opening in a distal end face of the elongate body towards the proximal end portion of the elongate body, wherein the distal end portion of the elongate body is provided with at least one protrusion inwardly projecting into the recess, wherein the elongate body further comprises a scraping surface at the distal end face of the elongate body, and wherein the at least one protrusion is substantially planar, with a major dimension of the substantially planar protrusion extending along at least a portion of a length of the elongate body.

2. The cleaning tool according to claim 1, wherein the at least one protrusion is elastically deformable.

3. The cleaning tool according to claim 1, wherein the elongate body is substantially cylindrical.

4. The cleaning tool according to claim 1, wherein at least a portion of the at least one protrusion is disposed at the distal end face of the elongate body.

5. The cleaning tool according to claim 1, wherein the at least one protrusion extends from a peripheral region of the elongate body towards a radial center of the elongate body.

6. The cleaning tool according to claim 1, wherein the at least one protrusion consists of a plurality of protrusions, each of which inwardly projects into the recess.

7. The cleaning tool according to claim 6, wherein the plurality of protrusions are uniformly disposed around the recess.

8. The cleaning tool according to claim 6, wherein the plurality of protrusions consist of between 2 protrusions and 4 protrusions.

9. The cleaning tool according to claim 1, wherein the recess extends from the distal end face of the elongate body to a base in the elongate body.

10. The cleaning tool according to claim 1, wherein the recess extends from the distal end face of the elongate body to one or more openings along a side wall of the elongate body.

11. The cleaning tool according to claim 1, wherein the scraping surface is defined by a second set of protrusions at the distal end face of the elongate body.

12. The cleaning tool according to claim 11, wherein each protrusion in the second set of protrusions has a curved edge defining the scraping surface.

13. The cleaning tool according to claim 1, wherein the scraping surface is disposed around a peripheral region of the distal end face of the elongate body.

* * * * *